(12) United States Patent
Pietrowski et al.

(10) Patent No.: US 6,732,695 B2
(45) Date of Patent: May 11, 2004

(54) INTAKE MANIFOLD FOR AN INTERNAL COMBUSTION ENGINE

(75) Inventors: Herbert Pietrowski, Pleidelsheim (DE); Thomas Jessberger, Rutesheim (DE); Ingo Koch, Ludwigsburg (DE); Helmut Neuschwander, Ludwigsburg (DE); Eckehard Mandel, Ludwigsburg (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 55 days.

(21) Appl. No.: 10/061,453

(22) Filed: Feb. 4, 2002

(65) Prior Publication Data

US 2002/0152982 A1 Oct. 24, 2002

Related U.S. Application Data

(63) Continuation of application No. PCT/EP00/07011, filed on Jul. 21, 2000.

(30) Foreign Application Priority Data

Aug. 3, 1999 (DE) .......................... 199 36 470

(51) Int. Cl.⁷ ................................ F02B 27/02
(52) U.S. Cl. .................. 123/184.55; 123/184.31
(58) Field of Search .................. 123/184.55, 184.31, 123/184.56

(56) References Cited

U.S. PATENT DOCUMENTS

| | | | |
|---|---|---|---|
| 4,854,271 A * | 8/1989 | Miyano et al. | 123/184.55 |
| 5,056,473 A * | 10/1991 | Asaki et al. | 123/184.55 |
| 5,492,088 A | 2/1996 | Ohrnberger | |
| 5,603,296 A * | 2/1997 | Park | 123/184.55 |
| 5,709,182 A | 1/1998 | Espe et al. | |
| 5,787,851 A * | 8/1998 | Sakurai et al. | 123/184.55 |
| 5,813,380 A | 9/1998 | Takahashi et al. | |
| 5,901,677 A * | 5/1999 | Ohrnberger et al. | 123/184.55 |
| 5,992,370 A * | 11/1999 | Pringle et al. | 123/184.55 |
| 6,055,958 A * | 5/2000 | Aoyama et al. | 123/184.55 |
| 6,092,499 A | 7/2000 | Spannbauer | |
| 6,260,528 B1 * | 7/2001 | Pringle et al. | 123/184.55 |
| 6,408,809 B2 * | 6/2002 | Suzuki | 123/184.55 |

FOREIGN PATENT DOCUMENTS

| | | |
|---|---|---|
| DE | 19539078 | 4/1997 |
| DE | 19603758 | 8/1997 |
| DE | 19651642 | 6/1998 |
| EP | 0747587 | 12/1996 |

* cited by examiner

Primary Examiner—Henry C. Yuen
Assistant Examiner—Jes Benton
(74) Attorney, Agent, or Firm—Crowell & Moring LLP (57) ABSTRACT

An intake manifold (10) for a multi-cylinder internal combustion engine includes a tubular intake distributor (12) from which a plurality of long intake tubes (13) extend and lead to the individual cylinders. Short intake tubes (14) likewise extend from the intake distributor and open into the respective associated long intake tubes (13). The intake distributor (12) and the long and short intake tubes (13, 14) are formed from a one-piece housing (11) which has a cavity (21) which intersects the short intake tubes (14). In this cavity (21) a control element (15) is installed, which includes flaps (16), flap frames (17), a shaft (19) and a control element frame (18). By moving the shaft (19) either rotationally or translationally, the short intake tubes (14) can be opened or closed. In contrast to arrangements known in the prior art, the control element (15) has no sealing elements which can catch or jam during assembly. Additionally, the arrangement of the flaps (16) on a continuous shaft (19) provides a space-saving apparatus.

8 Claims, 6 Drawing Sheets

INTAKE MANIFOLD FOR AN INTERNAL COMBUSTION ENGINE

CROSS REFERENCE TO RELATED APPLICATIONS

This application is a continuation of co-pending international patent application no. PCT/EP00/07011, filed Jul. 21, 2000, designating the United States of America, the entire disclosure of which is incorporated herein by reference. Priority is claimed based on Federal Republic of Germany patent application no. DE 199 36 470.2, filed Aug. 3, 1999.

BACKGROUND OF THE INVENTION

The invention relates to an intake manifold for a multi-cylinder internal combustion engine.

Ohrnberger et al., U.S. Pat. No. 5,901,677 (=DE 43 44 504) discloses an intake manifold system for a multi-cylinder internal combustion engine having a tubular intake distributor from which extend first intake tubes that lead to the individual cylinders. Second, shorter individual intake tubes also extend from the intake distributor and open into the associated individual intake tubes. The intake distributor and the first and second intake tubes form a one-piece component which has a longitudinal bore that intersects the second individual intake tubes for the cylinders. A drum controller with an opening for each second individual intake tube is inserted into this longitudinal bore. By rotating the drum controller, this opening can be brought into or out of alignment with the respective second individual intake tube.

The tightness of the drum controller, however, can be ensured only by using additional sealing elements, e.g., seal rings or seal cages. During assembly, however, these sealing elements can get tangled which makes assembly more difficult. Furthermore, the design and production of these sealing elements requires a high measure of care and tuning to achieve the required sealing force. In addition, chattering of the drum controller cannot be excluded.

Spannbauer, U.S. Pat. No. 6,092,499 (=DE 195 39 078) discloses an intake manifold for an internal combustion engine with an engine-side flange. This engine-side flange is connected with intake pipes that proceed from a plenum and with the cylinder head flange. The engine-side flange is provided with mounting bushings for mounting to the cylinder head flange. The plenum is partitioned by an adjustable partitioning element, which can separate or connect the intake pipe plenum and thereby influences the charging effect of the cylinders. The engine-side flange is used to mount the intake manifold to the cylinder head flange. This component is bulky, however, and increases the weight of the parts. In addition, it increases assembly complexity because several components are used. Due to this additional complexity and the greater number of individual components, the component costs of this intake manifold are higher.

German patent application no. DE 195 390 424 discloses an intake manifold for an internal combustion engine with an engine-side flange. This engine-side flange is connected with intake pipes that proceed from a plenum and with the cylinder head flange. The engine-side flange is provided with mounting bushings for mounting to the cylinder head flange. The plenum is partitioned by an adjustable partitioning element, which can separate or connect the intake pipe plenum and thereby influences the charging effect of the cylinders. The engine-side flange is used to mount the intake manifold to the cylinder head flange. This component is bulky, however, and increases the weight of the parts. In addition, it increases assembly complexity because several components are used. Due to this additional complexity and the greater number of individual components, the component costs of this intake manifold are higher.

SUMMARY OF THE INVENTION

It is the object of the present to provide an improved intake manifold for a multi-cylinder internal combustion engine.

Another object of the invention is to provide an intake manifold for an internal combustion engine which reduces the clearance required in the engine compartment.

A further object of the invention is to provide an intake manifold for an internal combustion engine which can be manufactured and installed in a cost-effective manner.

It is also an object of the invention to provide an intake manifold for an internal combustion engine which can be assembled in a relatively simple manner.

These and other objects are achieved in accordance with a first aspect of the present invention by providing an intake manifold for a multi-cylinder internal combustion engine, the manifold comprising an intake distributor; a plurality of adjacent first individual intake tubes extending from the intake distributor and each extending to a respective cylinder of the engine; a plurality of second, shorter individual intake tubes extending from the intake distributor and each opening into a respective first individual intake tube; a control element for blocking or unblocking the second individual intake tubes, the control element comprising at least two flaps arranged on a common shaft surrounded by flap frames and disposed in a common control element frame; the control element being installed as a complete unit in a sealed manner in the intake manifold; and the shaft with the flaps surrounded by flap frames and the control element frame being manufactured by assembly injection molding.

In accordance with a further aspect of the invention, the objects are achieved by providing an intake manifold for a multi-cylinder internal combustion engine comprising an intake distributor; a plurality of individual intake tubes each having a cross-section and extending from the intake distributor and ending in at least one cylinder head flange; and a control element for blocking or unblocking at least a part of the cross sections of the individual intake tubes, the control element comprising at least two flaps arranged on a common shaft surrounded by flap frames and disposed in a common control element frame; the control element being installed as a complete unit in a sealed manner in the intake manifold; and the shaft with the flaps surrounded by flap frames and the control element frame being manufactured by assembly injection molding.

The control element according to the invention comprises flaps that are arranged on a shaft and are installed in a common control element frame. Flaps in this connection should be understood as sealing elements in a wider sense, particularly rotary flaps and slide valves that are adjusted in translatory manner. This control element is constructed as a complete unit, which is installed in the intake manifold forming a seal. Since each flap has only a small circumferential surface that contacts the surrounding component, the effective seal length is very small. By arranging the flaps on a continuous shaft, the shaft can be supported directly in the control element frame without requiring any additional bearings and connecting points between the flaps. As a result, the control element is suitable even for small clearances.

Advantageously, the control element is inserted and fastened in a cavity in the intake manifold. This simplifies assembly and makes it possible to replace the control element if necessary.

Another embodiment provides for direct injection molding of the intake manifold onto the control element. This makes it possible to dispense with a mounting unit, sealing means and the assembly process.

In a further embodiment of the insertion of the control element in the intake manifold, the intake manifold is accomplished by disposing the control element between two molded halves so as to form a seal, e.g., by screwing or snapping it together with one of the halves. The two molded halves are then joined, e.g., screwed together, using a seal.

In one specific embodiment, the molded halves are welded together with the control element. In this case, the control element is disposed in a holder and the intake manifold halves are then welded together so as to form a seal. This fixes the control element within the intake manifold. In this type of an embodiment the control element is inserted into the holder in such a way that there is no leakage between the components. This embodiment moreover eliminates a sealing system between the intake manifold halves.

An alternative solution to the object of the invention is an intake manifold with an intake distributor, individual intake pipes proceeding therefrom, and a control element. The control element is disposed as a complete unit in a receptacle or holder on the intake manifold and adjoins the cylinder head flange. The control element serves to block or unblock a cross-sectional flow area. Several variants to unblock this cross-sectional flow area are feasible, e.g., complete unblocking of a flow area formed by the individual intake pipes. Partial unblocking of the flow area is also feasible, however, in which case an angular momentum that influences the filling ratio of the individual cylinders can be produced by the opening position of the flap.

Another variant is to use two cross-sectional flow areas adjoining the same individual intake pipe, so that the total flow area can be increased or decreased as needed. If one flow area is blocked completely, the air must flow through the other flow area. By opening the closed flow area, the total flow area of the individual intake pipe is increased so that more air can flow through it. The receptacle or holder for the control element on the intake manifold is configured in such a way that the control element forms a seal when installed. The control element forms the connection between the intake manifold and the cylinder head flange. The intake manifold does not need to have any contact points with the cylinder head flange.

A further embodiment of the invention envisions a connecting or attachment surface of the intake manifold disposed against the cylinder head flange. In this case, the holder for the control element is configured in such a way that the connecting surface is formed onto the holder and the connecting surface of the intake manifold adjoins the cylinder head flange.

In accordance with a further embodiment of the intake manifold, mounting bushings are installed on the control element. These mounting bushings are made of a material that does not relax, e.g., metal or ceramic. The mounting bushings can subsequently be introduced into the control element, particularly into the control element frame. The mounting bushings can either be pressed into or cast in the control element. Another option of introducing the mounting bushings into the control element is to place the bushings in a mold cavity and then injection mold the control element around them.

One advantageous embodiment of the inventive concept is to insert the flaps in a flap frame, which makes it possible to adjust the play or leakage of the flaps within the flap frame. This unit is then inserted in the control element frame.

In one specific embodiment of the invention, a control element frame is used which is made of metal. In this embodiment, the mounting bushings can be formed directly on the control element frame or introduced as an additional component. Other variants of the invention provide mounting points and holders, for instance for a drive unit for the control element or for an exhaust gas recirculation unit.

It is advantageous to insert the flaps in the flap frame using an assembly injection molding technique. This ensures a cost-effective and optimum fit of the flaps within the flap frame.

Another variant uses a metal shaft to which the flaps are mounted. Under heavy mechanical loads, a metal shaft cannot be deformed as easily as a shaft made of synthetic resin material, i.e, plastic. The flaps can be made, for example, of synthetic resin material injection molded onto the shaft in an injection molding process, or they can be made of metal and can, for instance, be screwed, riveted or welded to the shaft.

It is advantageous to insert the shaft together with the flaps into the control element frame by clipping or screwing the shaft into holders that are provided for this purpose. These methods are also suitable if flap frames are used. In this case, the flap frames are mounted to the control element frame. Another option, in addition to the above insertion variants, is to injection mold the control element frame around the control elements (flap, shaft and, where applicable, flap frames).

A special variant of the invention uses an assembly injection molding technique to produce the shaft with the flaps and the control element frame. In this case, the flap frame, if present, can be produced at the same time. In an embodiment without flap frames, the control element frame performs the function of the flap frames.

In accordance with another embodiment of the invention, the flaps are comprised of one or more slide valves that are arranged on a shaft. These slide valves are displaced in a translatory movement longitudinally of the shaft, which causes the openings in the intake ports to be opened or closed. This embodiment again has the above-described advantages of reduced space requirement. If there are several slide valves, they must be coupled together along the shaft to enable a single drive unit to displace all of the slide valves. It is particularly advantageous, however, to combine the individual slide valves into a single large slide valve, which is held in the form of a plate inside the flap frame and can be centrally controlled by the drive.

The slide is advantageously made of spring steel. This spring steel can be made particularly thin and due to its elasticity can compensate certain tolerances in the area of the control element frame. Tolerances that are transferred to the control element frame as the control element frame is assembled can also be compensated by the slide valve made of spring steel.

It is particularly advantageous to control and/or drive the slide with a double-acting cylinder. This can, in particular, be a pneumatic cylinder, which is moved by the pressure differences at the intake manifold. In contrast to a cylinder with a restoring spring, the double-acting cylinder has the advantage that it does not need to produce the actuating force against the spring force. This reduces the actuating forces that must be produced by the pressure differences.

These and other features of preferred embodiments of the invention, in addition to being set forth in the claims, are also disclosed in the specification and/or the drawings, and the individual features each may be implemented in embodiments of the invention either alone or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawings in which.

DETAILED DESCRIPTION OF PREFERRED EMBODIMENTS

Figure 1:
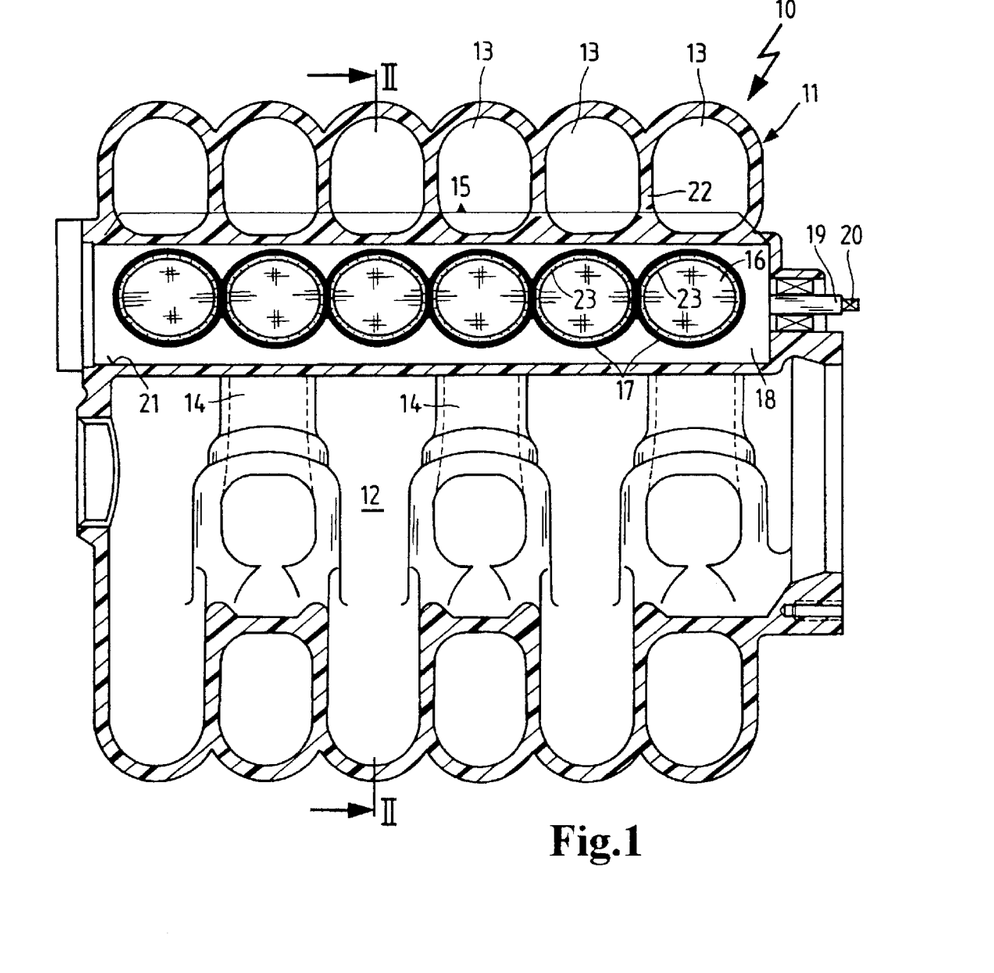
FIG. 1 is a longitudinal section of an intake manifold system.
Figures 2, 3:
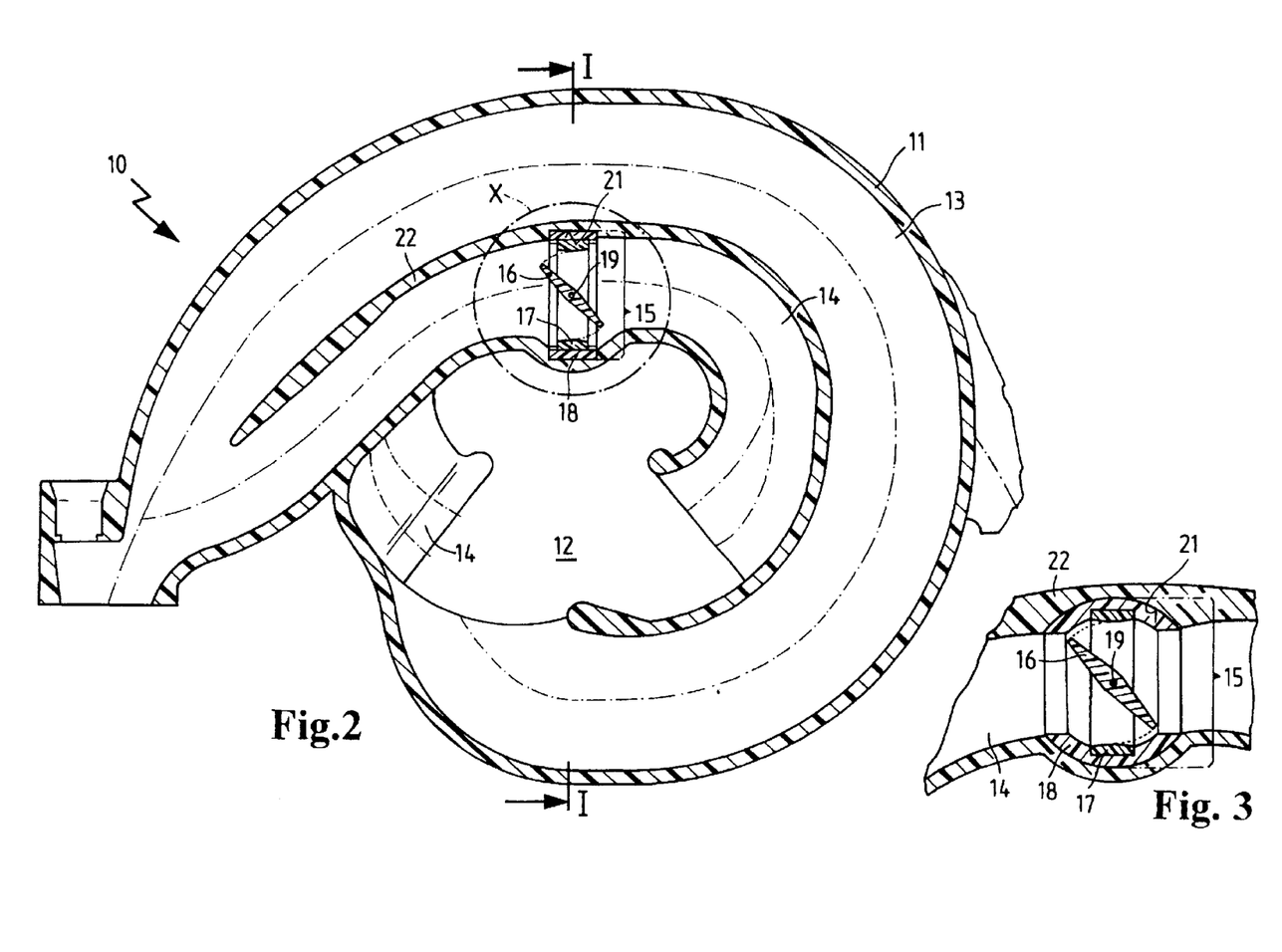
FIG. 2 is a cross section of an intake manifold system.
FIG. 3 is an enlarged, detail cross section of a variant of the control element from area X of FIG. 2.

FIG. 1 is a cross section of an intake manifold 10 for an engine with a V-shaped cylinder configuration taken along section line I—I according to FIG. 2. It has a one-piece synthetic resin housing 11 that comprises a central intake distributor 12 from which proceed long intake pipes 13, arranged parallel to one another, and short intake pipes 14, arranged radially within the long intake pipes 13. The synthetic resin housing 11 encloses a control element 15 that comprises flaps 16, flap frames 17, a control element frame 18 and a shaft 19.

The flaps 16 may be provided with a sealing lip 23 around their circumference, which is produced by a two-component molding technique. The flap position is controlled by shaft 19, which is, for instance, square at the shaft ends 20 for improved force transmission. In closed position, the flaps 16 are enclosed by the surrounding flap frame 17 forming a seal. The shaft 19 is supported in the flap frames 17 in such a way that no leakage occurs along shaft 19 between the short intake pipes 14.

The flap frames 17 are connected with the control element frame 18 so as to form a seal. Both these components ensure tightness of the short intake pipes 14 relative to a rectangular cavity 21 formed in the synthetic resin housing 11. The control element 15 is inserted into this cavity, which has apertures opening into each short intake pipe 14.

In an embodiment without flap frames 17, the function of the flap frames is performed by the control element frame 18.

FIG. 2 is a cross section of the intake manifold 10 along section line II—II. The short intake pipes 14 open out into the long intake pipes 13 just in front of their discharge into a cylinder (not shown). The intake pipes 13, 14 are separated from one another by partitions 22, which prevent pressure equalization. As soon as flap 16 is closed, no intake air can flow through the tit short intake pipe 14. Thus, the intake air must flow through the long intake pipe 13. If flap 16 is open, the intake air can flow through the short intake pipe 14, which has lower flow resistance due to its length. This figure does not show the sealing lip 23 shown in FIG. 1.

FIG. 3 shows another configuration of control element 15. In this variant, the control element frame 18 is constructed as a cylinder and is inserted into a cylindrical cavity 21. As in the above-described solution, flaps 16 are disposed in flap frame 17 so as to form a seal. Flap frame 17, in turn, is disposed in control element frame 18.

Figure 4:
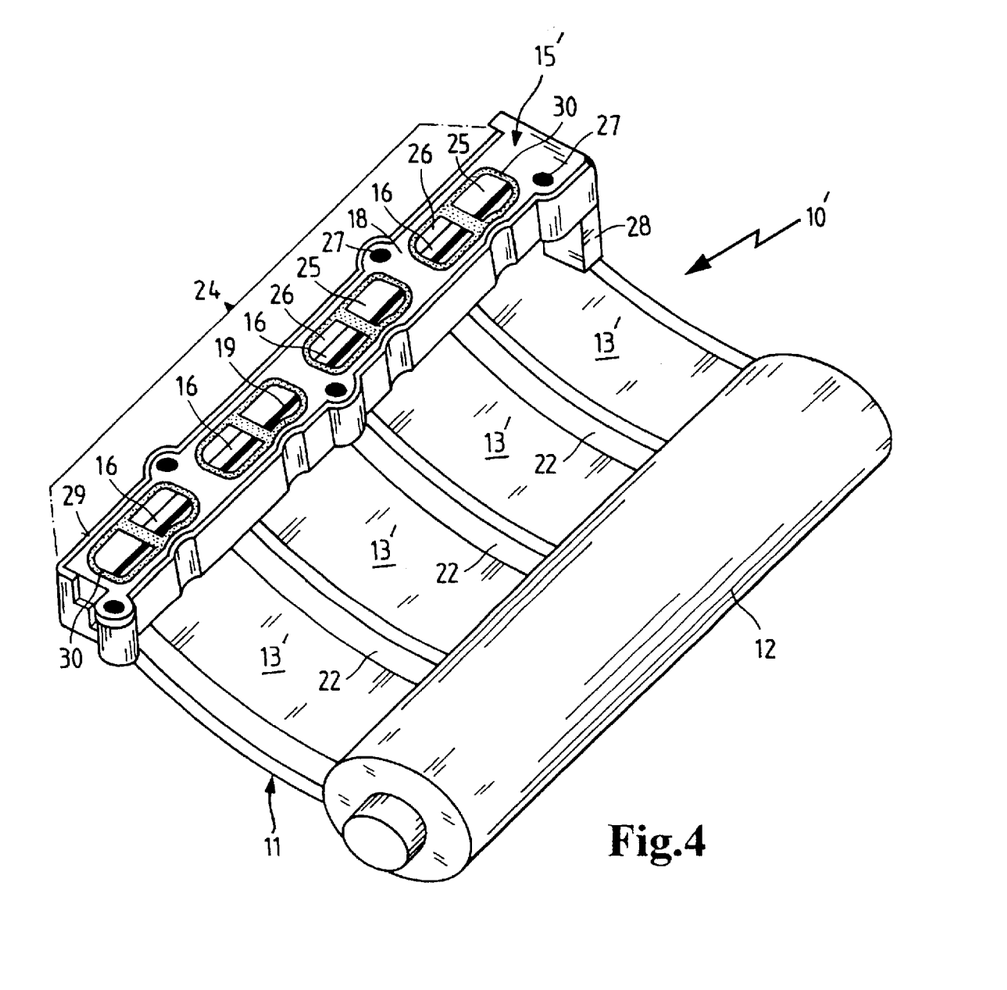
FIG. 4 is a perspective view of an intake manifold.

FIG. 4 is a perspective view of an alternate intake manifold system 10'. It comprises a synthetic resin housing 11 and a control element 15'. The synthetic resin housing 11 comprises an intake distributor 12, long intake pipes 13' extending therefrom and separated from one another by partitions 22, and a holder 24 for the control element 15'. The control element 15' is formed by a control element frame 18, flaps 16, and a one-piece shaft 19. The elements are made of aluminum.

For each long intake pipe 13', the control element 15' has a first and a second cross-sectional flow area 25, 26. The first cross-sectional flow areas 25 cannot be closed; air can always flow through them. The second cross-sectional flow areas 26 can be opened or closed by flaps 16. Thus, in the completely open state, a substantially greater amount of air can flow through the cross-sectional flow areas 25 and 26 than when areas 26 are in their closed state so that air can flow only through the first cross-sectional flow areas 25.

The control element 15' is provided with mounting bushings 27 that are integrated in the control element frame 18 for mounting to a cylinder head flange (not shown). In a control element frame 18, which is made of a material that is capable of relaxing, the mounting bushings 27 would be installed as an insert or a pressed-in part made of a non-relaxing material. The control element further has an adapter plate 28, to which, for example, a drive unit for shaft 19 can be mounted.

The holder 24 is configured in such a way that it has a connecting or attachment surface 29 which faces the cylinder head flange (not shown). The first and second cross-sectional flow area 25, 26 is enclosed by a circumferential seal 30. This seal 30 prevents any leakage airflow between the adjacently arranged cross-sectional flow areas of the other intake pipes 13'.

Figure 5:
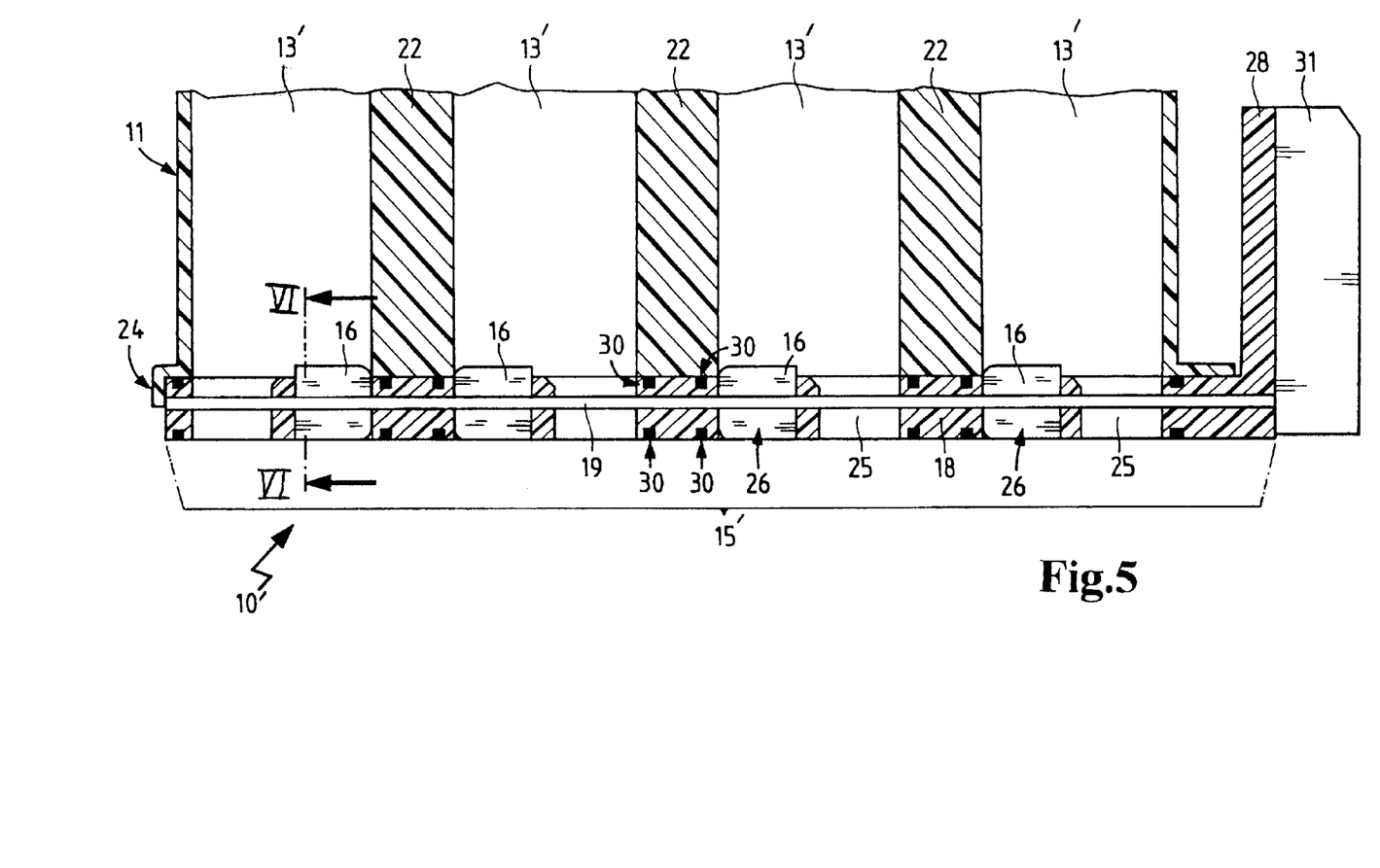
FIG. 5 is a cross-sectional detail of an intake manifold.
Figure 6:
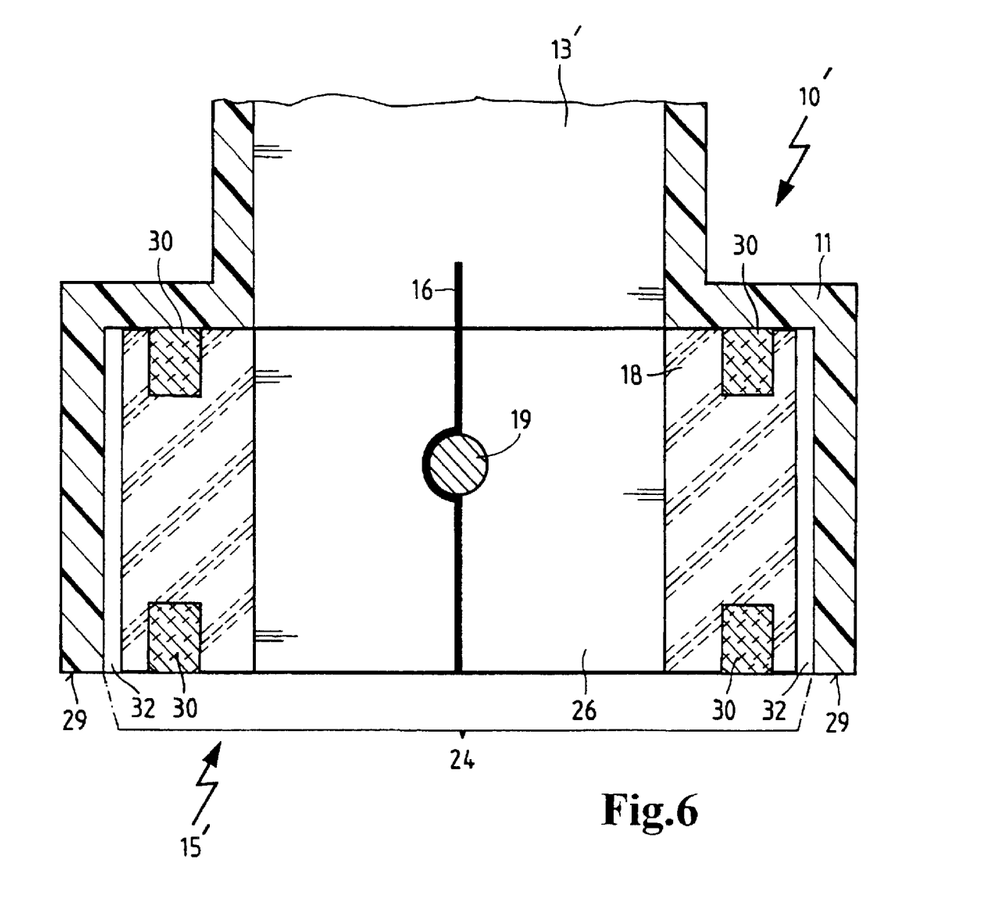
FIG. 6 is a cross-sectional detail of the intake manifold taken along line VI—VI of FIG. 5.

FIG. 5 is a cross-sectional detail of intake manifold 10'. The synthetic resin housing 11 forms the long intake pipes 13' and the partitions 22. The control element 15' is inserted into holder 24 of the synthetic resin housing 11. In this embodiment the holder 24 does not have a connecting surface 29 facing the cylinder head flange (not shown) as depicted in FIG. 6. To seal the intake pipes 13' with respect to one another, seals 30 are placed around each cross-sectional flow area pair formed by the first and the second cross-sectional flow areas 25, 26.

For each intake pipe 13', two seals 30 are required. One seal 30 seals the control element 15' relative to the synthetic resin housing 11, and the second seal 30 seals the control element 15' relative to the cylinder head flange (not shown). The flaps 16 are mounted on a continuous shaft 19. Shaft 19 is rotatably supported in the control element frame 18 and is driven by a drive 31 mounted to the adapter plate 28.

FIG. 6 shows a cross-sectional detail of the intake manifold 10 along section line VI—VI of FIG. 5. The holder 24 for the control element 15' is molded onto the synthetic resin housing 11. Holder 24 is provided with connecting surface 29, which lies at the same level as the control element frame 18. Due to the different materials used, the control element 15' and the synthetic resin housing 11 expand at different rates during temperature fluctuations. To prevent stresses in the holder 24 and possible damage, a gap 32 is provided to serve as an expansion buffer.

Figure 7:
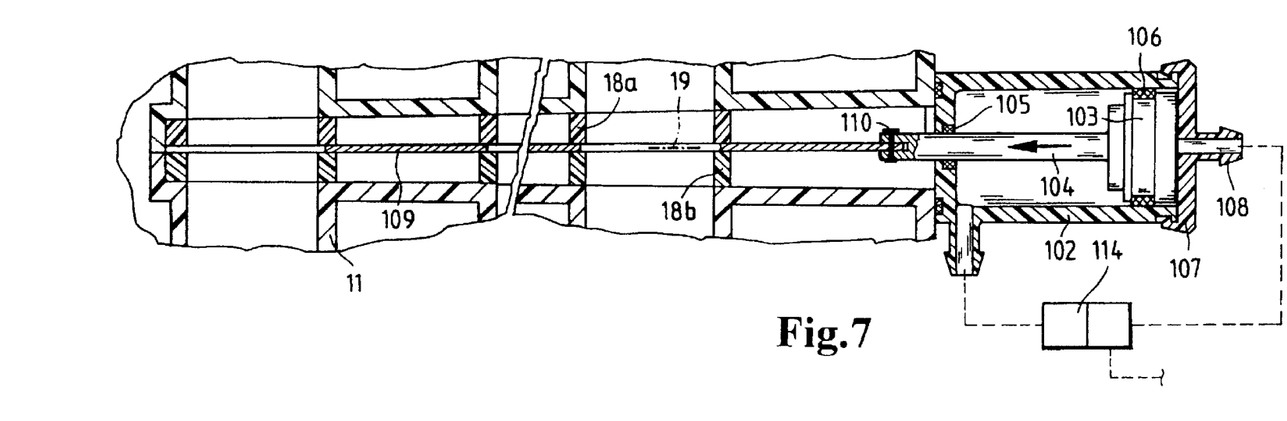
FIG. 7 is a cross section of a control element frame with flaps constructed as slide valves in their mounted state inside the intake manifold.

FIG. 7 depicts a control element frame 18a, b into which a slide 109 is inserted so as to be translationally displaceable longitudinally of shaft 19. This control element can be used either in an intake manifold according to FIG. 1 instead of the control element frame 18 shown there, or in an intake manifold according to FIG. 4.

Control element frame members 18a, b and slide 109 form a control module. This control module comprises a lower part 18b with an attached pneumatic cylinder 102. A piston 103 with a piston rod 104 is inserted in cylinder 102. The piston rod 104 is sealed with a radial seal 105. The piston is sealed with an additional sealing element 106. A cover 107 with a connection 108 can be latched to or screwed onto the cylinder.

The slide 109, which is made of spring steel, is disposed in the control element frame. The connection between slide 109 and piston rod 104 can, for instance, be a riveted connection 110. Upper part 18a and lower part 18b of the control element frame are joined together. The parts are configured in such a way that the slide 109 fits without play but is nevertheless able to move easily. Guide bumps 115 shown in FIG. 8 are provided for this purpose.

Figure 8:
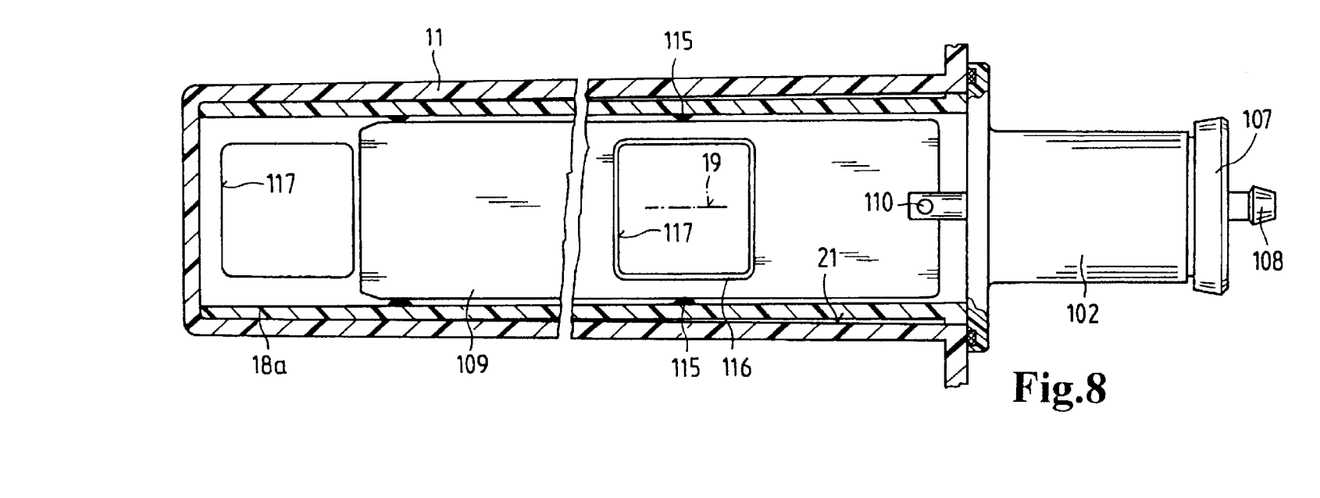
FIG. 8 is a top view of the control element frame according to FIG. 7 in its mounted state.

The construction of slide 109 is also illustrated by FIG. 8. The slide has windows 116 that slide in a translatory movement across cross-sections 117 of the intake ports to be closed. This ensures an infinitely variable or complete sealing capability of the ports. To move slide 109, the pneumatic cylinder 102 can be controlled, for instance, by a 4/2 directional control valve 114.

The control element frame 18a, b is inserted into the synthetic resin housing 11 of the intake manifold. The housing is only partially shown. The cavity 21 for insertion of the control element frame 18a, b may have a slightly conical configuration to provide a secure fit of the control element frame within the synthetic resin housing 11. This reduces the effects of tolerances of the individual components during assembly.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. An intake manifold for a multi-cylinder internal combustion engine, said manifold comprising:
    an intake distributor,
    a plurality of adjacent first individual intake tubes extending from the intake distributor and each extending to a respective cylinder of the engine;
    a plurality of second, shorter individual intake tubes extending from the intake distributor and each opening into a respective first individual intake tube;
    a control element for blocking or unblocking said second individual intake tubes, said control element comprising at least two flaps arranged on a common shaft surrounded by flap frames and disposed in a common control element frame;
    said control element being installed as a complete unit in a sealed manner in said intake manifold; and
    said shaft with the flaps surrounded by the flap frames and the control element frame being manufactured by assembly injection molding,
    wherein the intake manifold is injection molded onto the control element so as to form a seal.

2. An intake manifold for a multi-cylinder internal combustion engine, said manifold comprising:
    an intake distributor,
    a plurality of adjacent first individual intake tubes extending from the intake distributor and each extending to a respective cylinder of the engine;
    a plurality of second, shorter individual intake tubes extending from the intake distributor and each opening into a respective first individual intake tube;
    a control element for blocking or unblocking said second individual intake tubes, said control element comprising at least two flaps arranged on a common shaft surrounded by flap frames and disposed in a common control element frame;
    said control element being installed as a complete unit in a sealed manner in said intake manifold; and
    said shaft with the flaps surrounded by the flap frames and the control element frame being manufactured by assembly injection molding,
    wherein the flaps comprise at least one slide arranged in the control element frame so as to be translationally displaceable in the longitudinal direction of the shaft.

3. An intake manifold according to claim 2, wherein the slide is made of spring steel.

4. An intake manifold according to claim 2, wherein the slide is connected to a double-acting cylinder drive unit.

5. An intake manifold for a multi-cylinder internal combustion engine comprising:
    an intake distributor;
    a plurality of individual intake tubes each having a cross-section and extending from the intake distributor and ending in at least one cylinder head flange; and
    a control element for blocking or unblocking at least a part of the cross sections of the individual intake tubes, said control element comprising at least two flaps arranged on a common shaft surrounded by flap frames and disposed in a common control element frame;
    said control element being installed as a complete unit in a sealed manner in said intake manifold; and
    said shaft with the flaps surrounded by the flap frames and the control element frame being manufactured by assembly injection molding,
    wherein mounting bushings for mounting bores of the cylinder head flange are disposed on the control element, said mounting bushings being made of a non-relaxing material.

6. An intake manifold for a multi-cylinder internal combustion engine comprising:
    an intake distributor;
    a plurality of individual intake tubes each having a cross-section and extending from the intake distributor and ending in at least one cylinder head flange; and
    a control element for blocking or unblocking at least a part of the cross sections of the individual intake tubes, said control element comprising at least two flaps arranged on a common shaft surrounded by flap frames and disposed in a common control element frame;
    said control element being installed as a complete unit in a sealed manner in said intake manifold; and said shaft with the flaps surrounded by the flap frames and the control element frame being manufactured by assembly injection molding, wherein the flaps comprise at least one slide arranged in the control element frame so as to be translationally displaceable in the longitudinal direction of the shaft.

7. An intake manifold according to claim 6, wherein the slide is made of spring steel.

8. An intake manifold according to claim 6, wherein the slide is connected to a double-acting cylinder drive unit.

* * * * *